Oct. 26, 1926. 1,604,602
A. L. POWELL
TRANSMISSION FOR ENGINES
Filed April 16, 1921   3 Sheets-Sheet 1
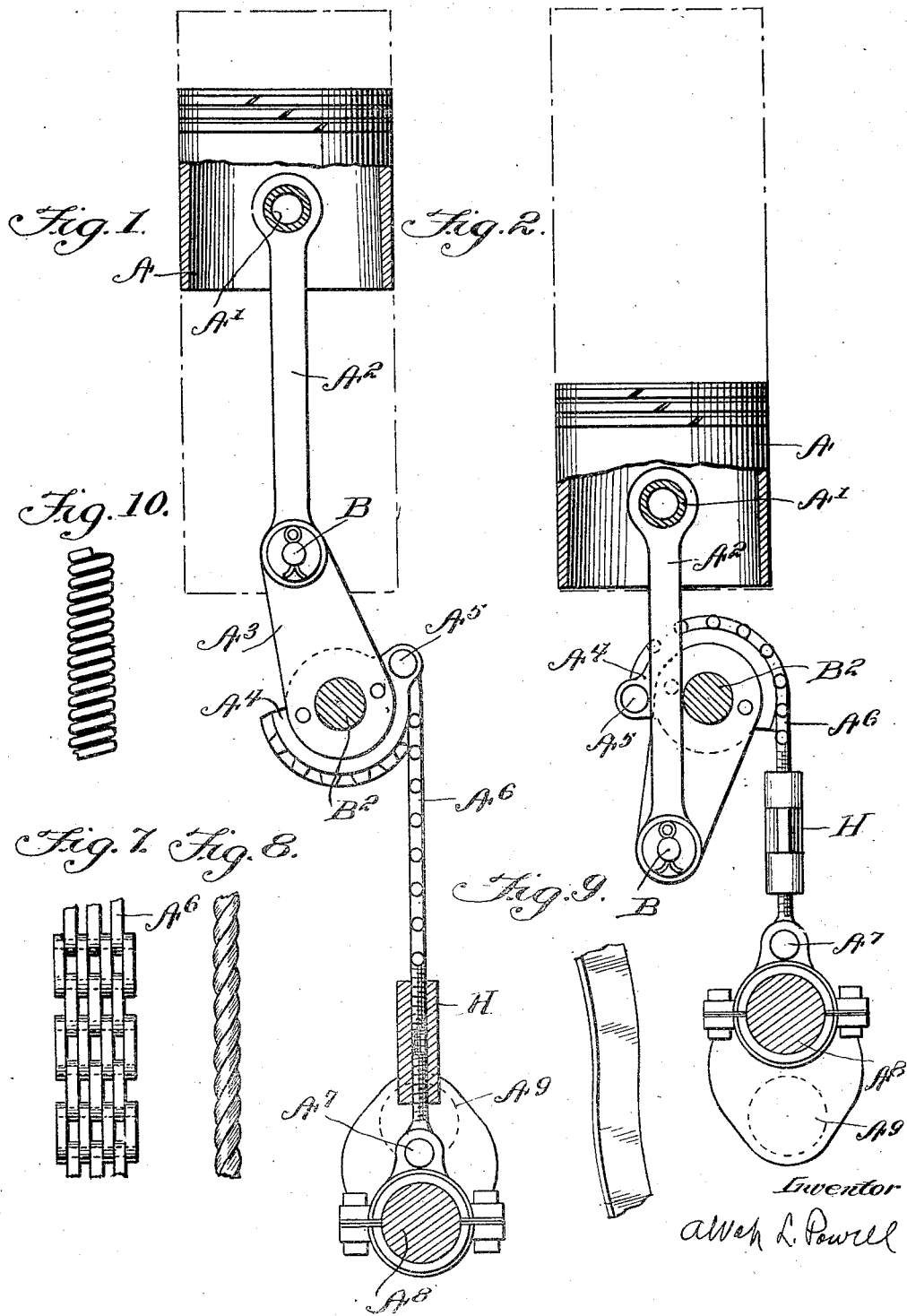

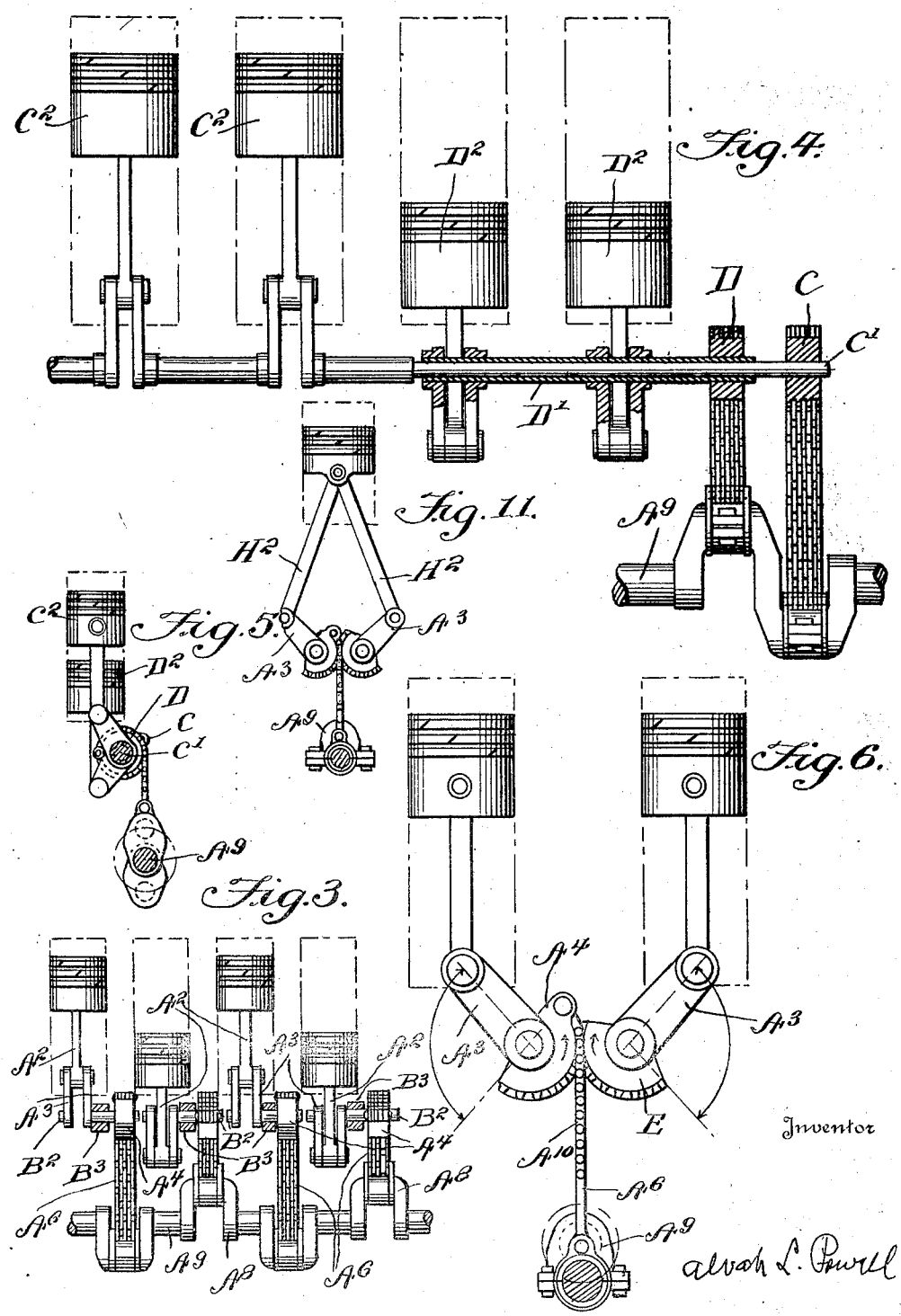

Oct. 26, 1926.
A. L. POWELL
1,604,602
TRANSMISSION FOR ENGINES
Filed April 16, 1921     3 Sheets-Sheet 3
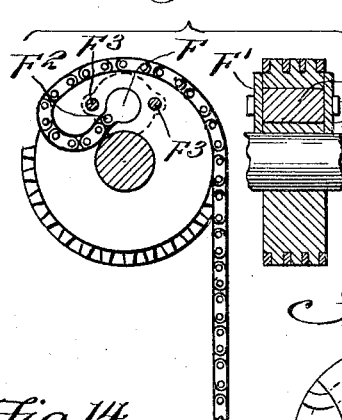
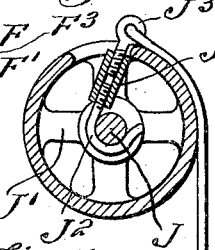
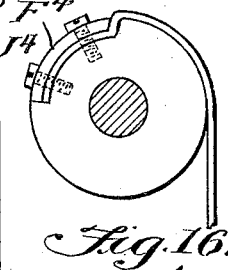
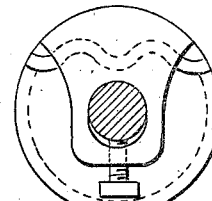
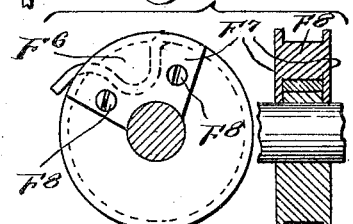
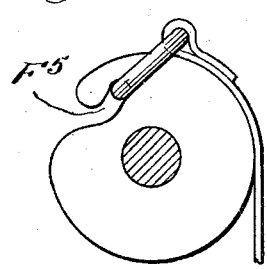
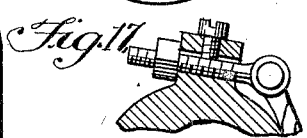
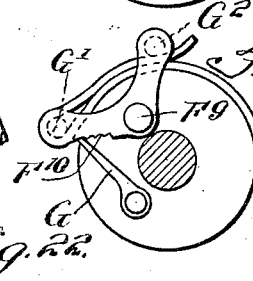
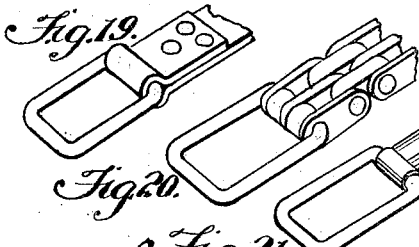
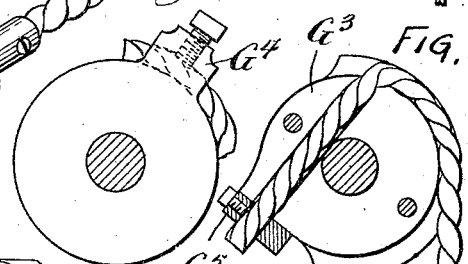
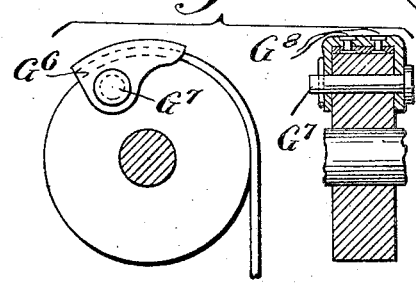
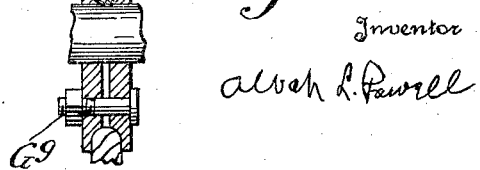
Inventor
Alvah L. Powell Patented Oct. 26, 1926.

1,604,602

UNITED STATES PATENT OFFICE.

ALVAH L. POWELL, OF MILES CITY, MONTANA, ASSIGNOR TO THE A. L. POWELL POWER CO., INC., OF MILES CITY, MONTANA, A BODY CORPORATE.

TRANSMISSION FOR ENGINES.

Application filed April 16, 1921. Serial No. 461,934.

My invention relates to improvements in transmission for engines in which I use a flexible means instead of the usual rigid connecting rod. My improvement is applicable to all types of reciprocating engines but I show it in the present application attached to one of the internal combustion type. This flexible member being always in tension, I obtain the advantages of a pull on the crank instead of the compression stress present in the construction followed in the present types of transmission. This makes it possible to use a lighter section for the transmission member, and causes a more favorable distribution of structural strains in the engine itself.

In the annexed drawings I show an embodiment of my idea, together with modifications thereof.

Fig. 1 is a vertical elevation of my invention, the piston being at the beginning of its firing stroke.

Fig. 2 is a partly similar construction, the piston being at end of downstroke.

Fig. 3 is a side view of the engine shown in Figs. 1 and 2.

Fig. 4 shows a novel arrangement of my improved transmission.

Fig. 5 is an end elevation of Fig. 4.

Fig. 6 shows a further modification of my invention.

Fig. 7 is a plan view of the chain section of the flexible connecting rod.

Figs. 8, 9, show a rope or cable, and belting, such as may be used instead of a chain.

Figs. 10, 11, 12, 13, 14, 15, 16, 17, 18, 19, 20, 21, 22, 23, 24, 25, and 26 show additional modifications of my invention, and various methods of connecting the flexible transmission member to the winding drum.

In Fig. 1, a piston A carries a wrist pin $A^1$, from which depends a piston rod $A^2$. This rod is operatively attached to a crank $A^3$, by a pin B. The crank $A^3$ is integral with a pin $B^2$, preferably supported in the engine frame. On the same pin there is a segmental sprocket, $A^4$, hereinafter called segment. Segment $A^4$ is rigidly fitted to pin $B^2$, $A^3$ and $A^4$ so that these parts oscillate synchronously.

The segment $A^4$ carries a pin, $A^5$, to which is attached a sprocket chain $A^6$. The opposite end of said chain is connected to a rod, as shown in the drawing, both rod and chain having the common symbol $A^6$. The flexible rod is operatively attached to a crank, $A^9$ (Fig. 2), by a wrist pin $A^8$, Fig. 1. In Fig. 3, supporting means for the pin $B^2$ are shown in section at $B^3$, $B^3$, $B^3$, $B^3$. included in the view given in Fig. 1, I show a turnbuckle slack adjusting means, at H.

The operation of the transmission is as follows:

On downstroke of piston the crank $A^3$ moves downward, in an arc, rocking the pin $B^2$. The segment $A^4$ oscillates in unison therewith and, by the action of pin $A^5$, exerts a pull on the flexible connecting rod $A^6$. This pull is transmitted to the crank $A^9$, causing it to partially rotate shaft $A^8$. On exhaust stroke (Fig. 2), the momentum of engine flywheel and parts, or the power effect of another cylinder (in a multiple cylinder engine), causes the crank to continue its rotation and, by the action of pin $A^7$, the flexible connecting rod $A^6$ is pulled downward, causing the segment $A^4$ to oscillate in reverse of its prior motion, returning crank $A^3$ to its original position (Fig. 1). This action is repeated through the power cycle.

It will be noted that $A^6$ is always in tension, due to its acting through an intermediate transmission in which the direction of piston stroke is made opposite to that of the crank $A^9$. It is not essential to use a toothed segment, for the same effect can be obtained with any flexible connecting material such as a cable, belt, or spring steel, as I have indicated in the Figs. 8, 9 and 10.

In Fig. 4, I show the working means I have described operatively connected to a multiple cylinder engine, in such a way that only two elements are required to transmit the action of four cylinders. It will be noted that a member, C, is fitted to a minor shaft, $C^1$, that connects with pistons $C^2$, $C^2$, by the cranks and piston rods shown; while a second element D operates pistons $D^2$, $D^2$, by a sleeve, $D^1$, that rocks on the said shaft $C^1$. In Fig. 5 an end elevation of these connections is shown.

In Fig. 6, an arrangement of cylinders is shown by which the action is maintained through a single flexible rod, $A^6$. The links $A^{10}$ mesh with segments $A^4$, E, the two pistons acting in unison.

In Fig. 11 I show an arrangement of parts similar to the form shown in Fig. 6, but in which only one cylinder is used. Two piston rods, $H^2$, $H^2$, from the same cylinder, engage the cranks $A^3$, $A^3$. It will be noted that by this construction all piston slap is neutralized.

I preferably make my transmission of a differential form, the long end of crank $A^3$ receiving the effect of the power stroke, while the smaller pitched segment transmits the power to the shaft crank $A^9$. The charge in the cylinder of an internal combustion engine is, in this way, left freer to expand, and combustion is augmented. The direct pressure of the engine crank, that is, the working load, is, in this way, concentrated on the segment, and is not, as with ordinary direct transmission systems, immediately connected to the piston. Under these conditions the conversion of fuel and air into heat approaches more nearly ideal proportions, free motion against low pressure favoring complete combustion. I thus add materially to the efficiency of any internal combustion engine equipped with my improved transmission.

In Fig. 10 a coil spring is shown. The flexible member may be made entirely of such a spring.

In Fig. 12, a fastening means for a chain is shown. A pin, F, mounted in the drum on glands $F^1$, $F^1$, carries a minor pin $F^2$ to which the chain is attached. The glands are held to drum preferably by screws $F^3$, $F^3$.

In Fig. 13 a flexible means, in this case consisting of either leather, steel, or other suitable material, is held to drum by a plate, $F^4$, that is fastened to said drum by screws, as shown.

In Fig. 14, a drum is shown cut away at a point, $F^5$, to form a hook. Over this hook links may be caught, being retained in place by the tension of the transmission member. In Figs. 19, 20, 21, links are shown attached to belting, a chain, and cable. In Fig. 15, a corrugated plate is fitted to similar surfaces in the drum, the belting being held between, slippage being minimized. In Fig. 16, a construction like that in Fig. 15 is given, the retaining plate $F^6$ being held by end lugs, $F^7$, that are fastened to the sides of the drum by screws or bolts, $F^8$. In Fig. 17 an adjustment means to be used, preferably, with the cable form of flexible member is shown. Fig. 18 represents a simple and easily operated retaining means. Rocking arms on each side of drum are pivoted at $F^9$. On the surface $F^{10}$ teeth are cut in which fits a pawl G. The flexible member is fastened over a pin, $G^1$, and passes under a second pin, $G^2$, that acts as a guide. Slack may be taken up by slipping the pawl into a different tooth, changing the angle of the pin $G^1$ with reference to the center $F^9$. In Fig. 22 a cable is held to drum by a screw clamp, $G^4$. In Fig. 23 the construction just described is replaced by a plate, $G^3$, that clamps the cable by means of a bolt, $G^5$. In Fig. 24 two views of a clamping means for a belt member is given. A clamp $G^6$ is held on the drum by a pin, $G^7$. The flexible member is retained in position beneath it by countersunk screws, $G^8$. In Fig. 25 I show a retaining means formed of two disks, drilled to permit the introduction of the end of a cable, the said disks then being drawn together by bolts, $G^9$, $G^9$. In Fig. 26 I show a further modification of the retaining means. In this a shaft, J, carries spiders, $J^1$ (only one being shown). A hook, $J^2$, slips over the shaft J as shown. The belt is attached to $J^2$ at $J^3$. The tension of the belt holds the hook $J^2$ in place. It will be noted that an adjustment means for taking up slack is provided at $J^4$.

Many modifications of my improvement are possible without departing from my invention.

What I believe is new and ask to have protected by Letters Patent is—

1. In a transmission for engines, the combination of a power developing means, a crank, connecting means from said power developing means to said crank, a pin on which said crank is mounted, a winding means on said pin, a power shaft, a power crank thereon, and a flexible transmission member connecting said winding means and power crank, substantially as described.

2. In a transmission for engines, a piston, a piston rod, means for connecting said piston rod to said piston, a crank, a pin carrying the crank, means for connecting said piston rod to said crank, a winding means on said pin, said crank and said winding means oscillating synchronously, a power crank, and flexible connecting means between said power crank and said winding means, substantially as described.

3. In combination, an oscillating pin having a crank arm and a segmental sprocket mounted thereon, a power shaft, a flexible means connecting the segment and the power shaft and a means for imparting an oscillatory motion to the crank arm, said flexible means being adjustable so as to vary the tension thereof.

4. In combination, an oscillating pin having a crank arm and a segment mounted thereon, said crank arm being longer than the radius of the segment, a power shaft, a flexible means having a turnbuckle adjustment intermediate its ends to adjust the tension thereof, said flexible means connecting the segment and the power shaft and a means for imparting an oscillatory motion to the crank arm.

5. In combination, an oscillating pin having a crank arm and a segment mounted thereon, a power crank shaft, a sleeve loosely mounted on the crank pin thereof, a lug on the sleeve, a pin carried by the lug, a short rod attached to the pin, and adjusting means mounted on the rod, a connecting means connecting the segment and the adjusting means and a power means for operating the crank arm.

In testimony whereof I affix my signature.

ALVAH L. POWELL.